(No Model.)

W. M. UPDEGRAVE.
ANTI FRICTION ROLLER BEARING.

No. 366,534. Patented July 12, 1887.

WITNESSES
B. Fugitt.
Phill. C. Urasi.

INVENTOR
W. M. Updegrave,
by Anderson & Smith
his Attorneys

United States Patent Office.

WILLIAM MARSH UPDEGRAVE, OF JOHNSTOWN, PENNSYLVANIA.

ANTI=FRICTION ROLLER-BEARING.

SPECIFICATION forming part of Letters Patent No. 366,534, dated July 12, 1887.

Application filed February 12, 1887. Serial No. 227,411. (No model.)

*To all whom it may concern:*

Be it known that I, WILLIAM MARSH UPDEGRAVE, a citizen of the United States, and a resident of Johnstown, in the county of Cambria and State of Pennsylvania, have invented certain new and useful Improvements in Anti-Friction Roller-Bearings; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
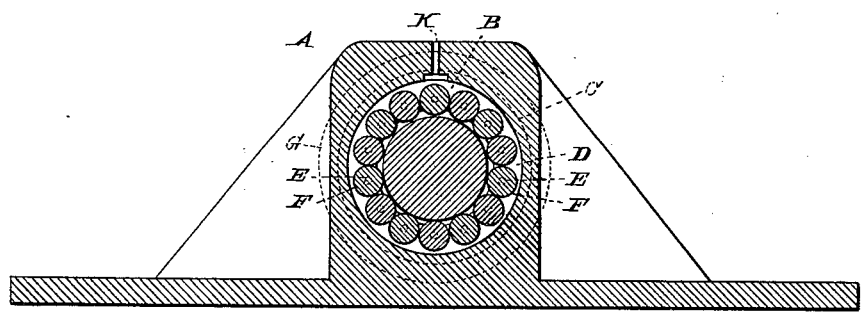
Figure 2:
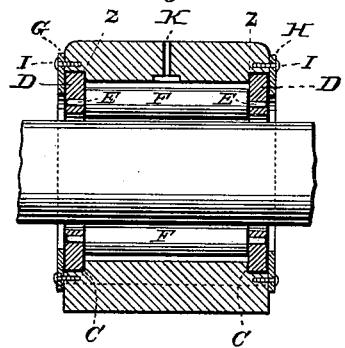
Figure 3:
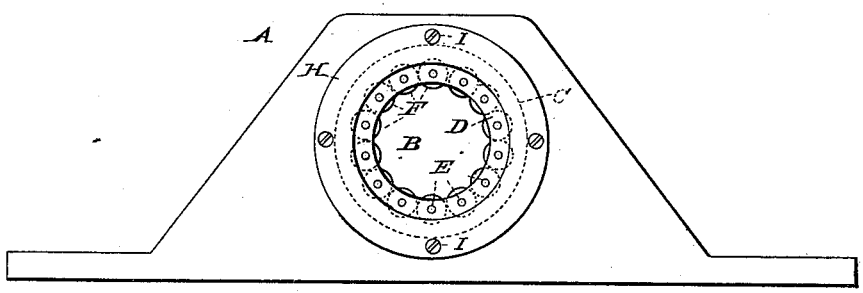

Figure 1 of the drawings is a representation of this invention, and is a vertical section taken lengthwise of the box. Fig. 2 is a vertical section taken across the box. Fig. 3 is a side view.

My invention relates to anti-friction journal-bearings for the journals of railway-cars, street cars, or for any other place where a journal is supported in boxes; and it consists in the construction and novel combination of parts, as hereinafter described and claimed.

Referring by letter to the accompanying drawings, A designates a journal-box having a journal-seat, B, made therein. At each end of the journal-seat B is provided a collar-seat or ring-seat, C, the boxing being annularly shouldered at $z$ at each end of the opening or journal-seat to provide annular seats of greater diameter than the bore.

In the ring-seats C C rotating bearing-rings D D are placed. These bearing-rings D D are perforated to receive the pins or journals E E of the rollers F, which surround the journal to be supported.

Collars G H are secured to the ends of the journal-box A, and retain the bearing-rings and rollers in place in the shouldered ring-seats. The rollers F revolve in their bearings in the rings D D, and the rings D D revolve in the ring-seats C C when the axle or other shaft is revolved. The collars G H are retained in place by screws I. In this construction the bearings are made of open-hearth chilled steel.

The shape of the journal-box may be varied.

K is an opening or oil-hole for introducing the lubricant. No waste or packing is used with this box to retain the lubricant. The rings and friction-rolls revolve independently and obviate all danger of hot boxes.

Having described this invention, what I claim, and desire to secure by Letters Patent, is—

The combination, with a journal-box having a transverse bore formed with shoulders $z$ at its ends to provide annular seats C of greater diameter than said bore, of the perforated bearing-rings in said seats, friction-rolls journaled in said bearing-rings, the exterior retaining-collars, and their securing-screws, substantially as specified.

In testimony whereof I affix my signature in presence of two witnesses.

WM. MARSH UPDEGRAVE.

Witnesses:
    Y. A. GRIFFITH,
    J. F. UPDEGRAVE.